United States Patent
Cole

(10) Patent No.: US 11,943,322 B2
(45) Date of Patent: *Mar. 26, 2024

(54) INTERCEPTOR HUB FOR SERVICE-CONSUMING APPLICATIONS

(71) Applicant: UNITED STATES POSTAL SERVICE, Washington, DC (US)

(72) Inventor: Craig Alan Cole, Farmington, MN (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 17 days.

This patent is subject to a terminal disclaimer.

(21) Appl. No.: 17/750,759

(22) Filed: May 23, 2022

(65) Prior Publication Data

US 2023/0015785 A1    Jan. 19, 2023

Related U.S. Application Data

(63) Continuation of application No. 17/372,684, filed on Jul. 12, 2021, now Pat. No. 11,349,956.

(51) Int. Cl.
*H04L 67/63* (2022.01)
*G06F 9/54* (2006.01)
*H04L 67/133* (2022.01)
*H04L 67/51* (2022.01)

(52) U.S. Cl.
CPC .............. *H04L 67/63* (2022.05); *G06F 9/547* (2013.01); *H04L 67/133* (2022.05); *H04L 67/51* (2022.05)

(58) Field of Classification Search
CPC ....... G06F 9/547; H04L 67/327; H04L 67/16; H04L 67/40
USPC ........................................................ 709/219
See application file for complete search history.

(56) References Cited

U.S. PATENT DOCUMENTS

| | | | |
|---|---|---|---|
| 7,933,290 B2 | 4/2011 | Aholainen | |
| 9,998,564 B1* | 6/2018 | Kaukl | ........................ H04L 9/40 |
| 2004/0167960 A1 | 8/2004 | Kinner et al. | |
| 2009/0235325 A1 | 9/2009 | Dimitrakos et al. | |

(Continued)

OTHER PUBLICATIONS

Notice of Allowance issued in U.S. Appl. No. 17/372,684 dated Feb. 4, 2022, 9 pages.

(Continued)

*Primary Examiner* — Wing F Chan
*Assistant Examiner* — Leon Y Tseng
(74) *Attorney, Agent, or Firm* — MH2 TECHNOLOGY LAW GROUP, LLP

(57) ABSTRACT

A method, a computing device, and a computer program product are provided. An interceptor hub application executing on a first computing device receives, via a network, a request for multiple services from a first service-consuming application executing on a second computing device. The multiple services execute on at least one other computing device and are accessible via the first computing device via the network. The interceptor hub application sends a respective request to each of the requested services executing on a corresponding one of the at least one other computing device. A respective service response from the each of the respective services is received by the interceptor hub application, which provides each of the respective responses in a combined service response to the first service-consuming.

20 Claims, 8 Drawing Sheets

(56) References Cited

U.S. PATENT DOCUMENTS

2010/0329269 A1    12/2010  Selitser et al.
2014/0181267 A1*    6/2014  Wadkins .............. H04L 69/163
                                                            709/219
2014/0372509 A1    12/2014  Fausak et al.
2018/0084392 A1*    3/2018  Razfar ................... H04L 51/58

OTHER PUBLICATIONS

International Search Report and Written Opinion issued in corresponding International Patent Application No. PCT/US2022/030495 dated Aug. 19, 2022, 6 pages.

* cited by examiner

INTERCEPTOR HUB FOR SERVICE-CONSUMING APPLICATIONS

CROSS-REFERENCE TO RELATED APPLICATIONS

This application is a continuation application of U.S. Utility patent application Ser. No. 17/372,684, entitled "Interceptor Hub for Service-Consuming Applications," filed Jul. 12, 2021, which is hereby incorporated by reference in its entirety.

BACKGROUND

When a service executing on a computing device changes, resulting in a change to an application program interface (API) of the service, service-consuming applications that call the service generally should be modified in order to remain compatible with the service. A failure to modify a service-consuming application that calls the service will cause the unmodified service-consuming application(s) to function in unexpected ways or not at all when calling the service.

Similarly, when an existing service is to be called from service-consuming applications that use protocols different from those used by the existing service, changes should be made to the service-consuming applications to be able to use the existing service.

SUMMARY

In a first aspect of various embodiments, a method provides an interceptor interface for service-consuming applications. According to the method, an interceptor hub application executing on a first computing device receives, via a network, a request for multiple services from a service-consuming application executing on a second computing device, the multiple services being executed on at least one other computing device and being accessible via the first computing device through the network. A respective request is sent by the interceptor hub application to the each of the requested services executing on a corresponding one of the at least one other computing device. The interceptor hub application receives a respective service response from the each of the respective services and provides each of the respective service responses in a combined service response to the first service-consuming application.

In a first variation of the first aspect, a second service is executed on the first computing device. The second service receives a second request for the second service from a second service-consuming application. In response to receiving the second request, the second service sends a request for a third service to a second interceptor hub application executing on a computing device different from the first computing device. The second service receives from the second interceptor hub application a third service response. After receiving the third service response from the third service, the second service sends a second service response to the second service consuming application.

In a third variation of the first aspect, the interceptor hub application manages which service-consuming applications can request which services.

In some embodiments of the third variation of the first aspect, the interceptor hub application maintains a database that includes information regarding service-consuming applications and services which each of the service-consuming applications are permitted to use.

In a fourth variation of the first aspect, an application program interface between the interceptor hub application and the first service-consuming application includes a RESTful application program interface.

In a fifth variation of the first aspect, a first application interface through which the interceptor hub application receives a request for a particular service is different from a second application program interface through which the interceptor hub application sends the request for the particular service to the particular service.

In a sixth variation of the first aspect, responsive to the interceptor hub application sending a request to a particular service, the interceptor hub application receives a service response from the particular service. The interceptor hub application directly stores information included in the service response from the particular service to a database used by a service-consuming application that originated the request to the particular service.

In a second aspect of the various embodiments, a computing device is provided that executes an interceptor hub application for an interceptor interface for service-consuming applications. The computing device includes at least one processor, and a memory connected to the at least one processor. The interceptor hub application on the computing device is configured to perform operations of the interceptor hub application. According to the operations, a request for multiple services from a first service-consuming application executing on a second computing device is received via a network. The multiple services execute on at least one other computing device and are accessible via the first computing device through the network. A respective request is sent to each of the requested multiple services executing a corresponding one of the at least one other computing device. In response to the sending of the respective requests, a respective service response is received from the each of the multiple respective services. Each of the respective service responses is provided in a combined service response to the first service-consuming application.

In a first variation of the second aspect, a second service is executed on the computing device. The second service receives a second request for the second service from a second service-consuming application. In response to receiving the second request, the second service sends a request for a third service to a second interceptor hub application executing on a second computing device different from the computing device. The second service receives from the second interceptor hub application a third service response. After receiving the third service response from the third service, the second service sends a second service response to the second service-consuming application.

In a second variation of the second aspect, the operations further include managing which service-consuming applications can request which services.

In a third variation of the second aspect, the operations further include maintaining a database that includes information regarding service-consuming applications and services which each of the service-consuming applications is permitted to use.

In a fourth variation of the second aspect, an application program interface between the interceptor hub application and the first service-consuming application includes a RESTful application program interface.

In a fifth variation of the second aspect, a first application interface through which the interceptor hub application is receives a request for a particular service is different from a second application program interface through which the interceptor hub application sends the request for the particular service to the particular service.

In a sixth variation of the second aspect, responsive to the interceptor hub application sending a request to a particular service, the interceptor hub application receives a service response from the particular service. The interceptor hub application directly stores information included in the service response from the particular service to a database used by a service-consuming application that originated the request to the particular service.

In a third aspect of the various embodiments, a computer program product is provided having at least one non-transitory computer readable storage medium with computer readable code embodied therewith for execution on a first computing device. The computer readable program code is configured to be executed by the first computing device to perform operations of a first interceptor hub application. According to the operations, a request for multiple services is received, via a network, from a first service-consuming application executing on a second computing device. The multiple services execute on at least one other computing device and are accessible via the first computing device through the network. A respective request is sent to the each of the requested multiple services executing on a corresponding one of the at least one other computing device. In response to the sending of the respective requests, a respective service response from the each of the multiple respective services is received, and each of the respective service responses is provided in a combined service response to the first service-consuming application.

In a first variation of the third aspect, a second service is executed on the computing device. The second service receives a second request for the second service from a second service-consuming application. In response to receiving the second request, the second service sends a request for a third service to a second interceptor hub application executing on a second computing device different from the first computing device. The second service receives from the second interceptor hub application a third service response. After receiving the third service response from the third service, the second service sends a second service response to the second service-consuming application.

In a second variation of the third aspect, the operations further include managing which service-consuming applications can request which services. The managing further includes maintaining a database including information regarding service-consuming applications and services which each of the service-consuming applications is permitted to use.

In a third variation of the third aspect, an application program interface between the first interceptor hub application executing on the first computing device and the first service-consuming application includes a RESTful application program interface.

In a fourth variation of the third aspect, a first application interface through which the interceptor hub application receives a request for a particular service is different from a second application program interface through which the first interceptor hub application sends the request for the particular service to the particular service.

In a fifth variation of the third aspect, a first application program interface through which the first interceptor hub application receives a request for a particular service is different from a second application program interface through which the first interceptor hub application sends the request for the particular service to the particular service.

DESCRIPTION OF THE DRAWINGS

The accompanying drawings, which are incorporated in and constitute a part of this specification, illustrate embodiments of the present teachings and together with the description, serve to explain the principles of the present teachings. In the drawings.

DETAILED DESCRIPTION

Throughout this specification, the terms "interceptor hub application" and "interceptor hub" are defined as an interceptor hub application executing on a computing device. The terms may be used interchangeably.

Reference will now be made in detail to the present examples of embodiments of the disclosure, several examples of which are illustrated in the accompanying drawings.

Figure 1:
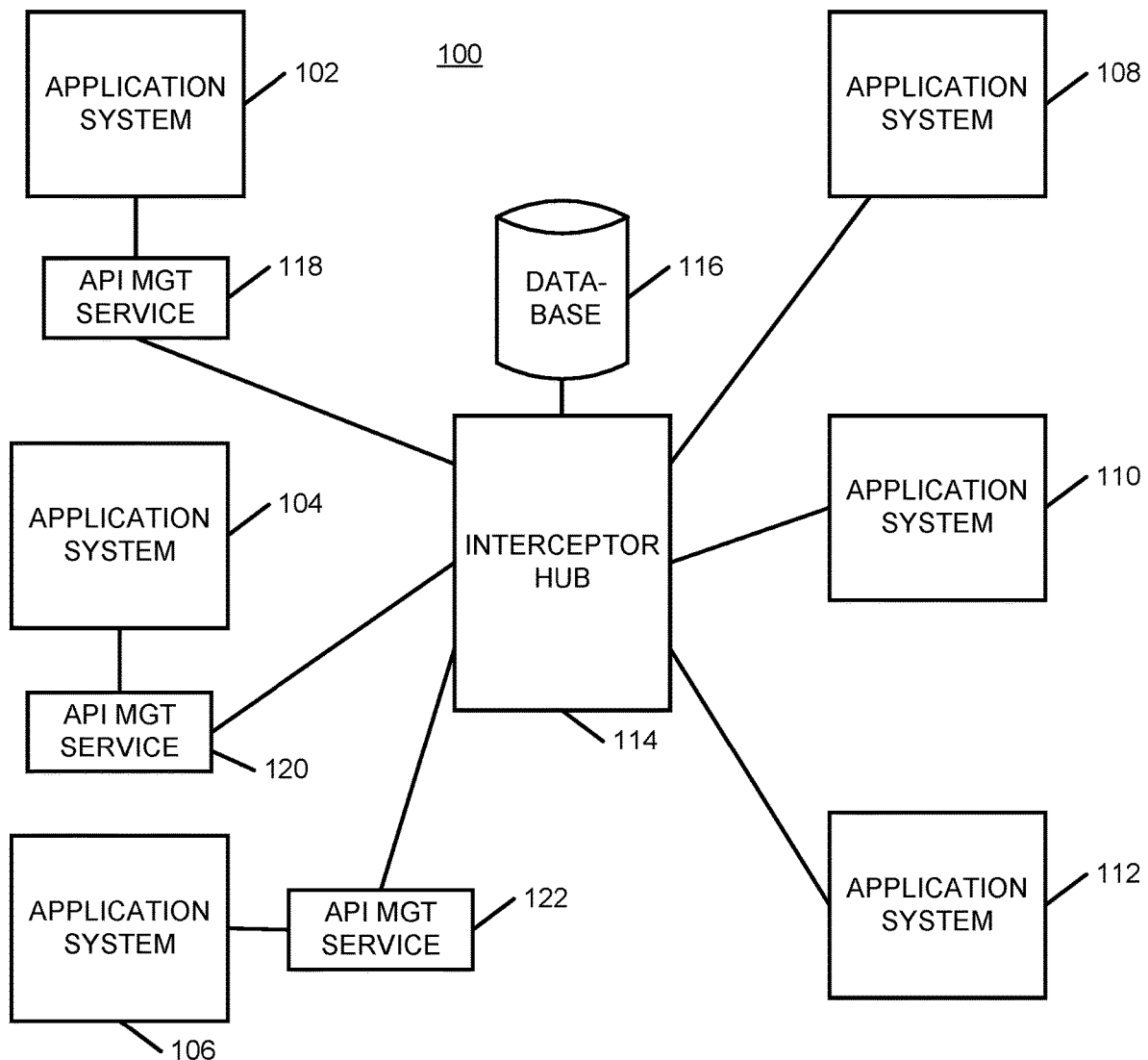
FIG. 1 illustrates an example environment in which embodiments may operate.

FIG. 1 illustrates an example environment 100 in which various embodiments may be implemented. Application systems 102, 104, 106, 108, 110, 112 may include one or more service-consuming applications and/or one or more service-providing applications (i.e., services).

In some embodiments, some application systems such as, for example, application systems 102, 104, 106 may connect to an interceptor hub 114 via API management services 118, 120, 122, respectively. Other application systems such as, for example, application systems 108, 110, 112 may connect to interceptor hub 114 via the network without using API management services.

Interceptor hub 114 may include a computing device that intercepts a call to a service from a service-consuming application and accesses a database 116 to determine whether the service-consuming application is authorized to use the service, an address of an application system on which the service resides, characteristics of a first API and a first protocol used by the service consuming application to call the service, and characteristics of a second API and a second protocol used by the service to return a service response to interceptor hub 114. Interceptor hub 114 may receive the call from the service-consuming application via the first API and the first protocol, may perform any required data conversions, and forward the call to the requested service using the second API and the second protocol. The requested service may generate a service response and provide the service response to interceptor hub 114 via the second API and the second protocol. Interceptor hub 114 may perform any required data conversions and may forward the service response to the service-consuming application via the first API and the first protocol.

In embodiments in which service-consuming applications executing on at least some application systems communicate with interceptor hub 114 via a corresponding API management service, the service-consuming applications or users may log into a corresponding application executing on the corresponding API management service before any calls are made from the service-consuming applications to services via interceptor hub 114. The corresponding API management services may authenticate the service-consuming applications or the users before accepting service calls from the service-consuming applications. In some embodiments, the API management services may include a DataPower® appliance (DataPower is a registered trademark of International Business Machines Corporation of Armonk, NY). The DataPower® appliance may provide security services such as, for example, authentication of service-consuming applications or users.

In embodiments in which service-consuming applications do not communicate with corresponding API management services, authentication services may be provided by, for example, interceptor hub 114 or other servers within the network.

Figure 2:
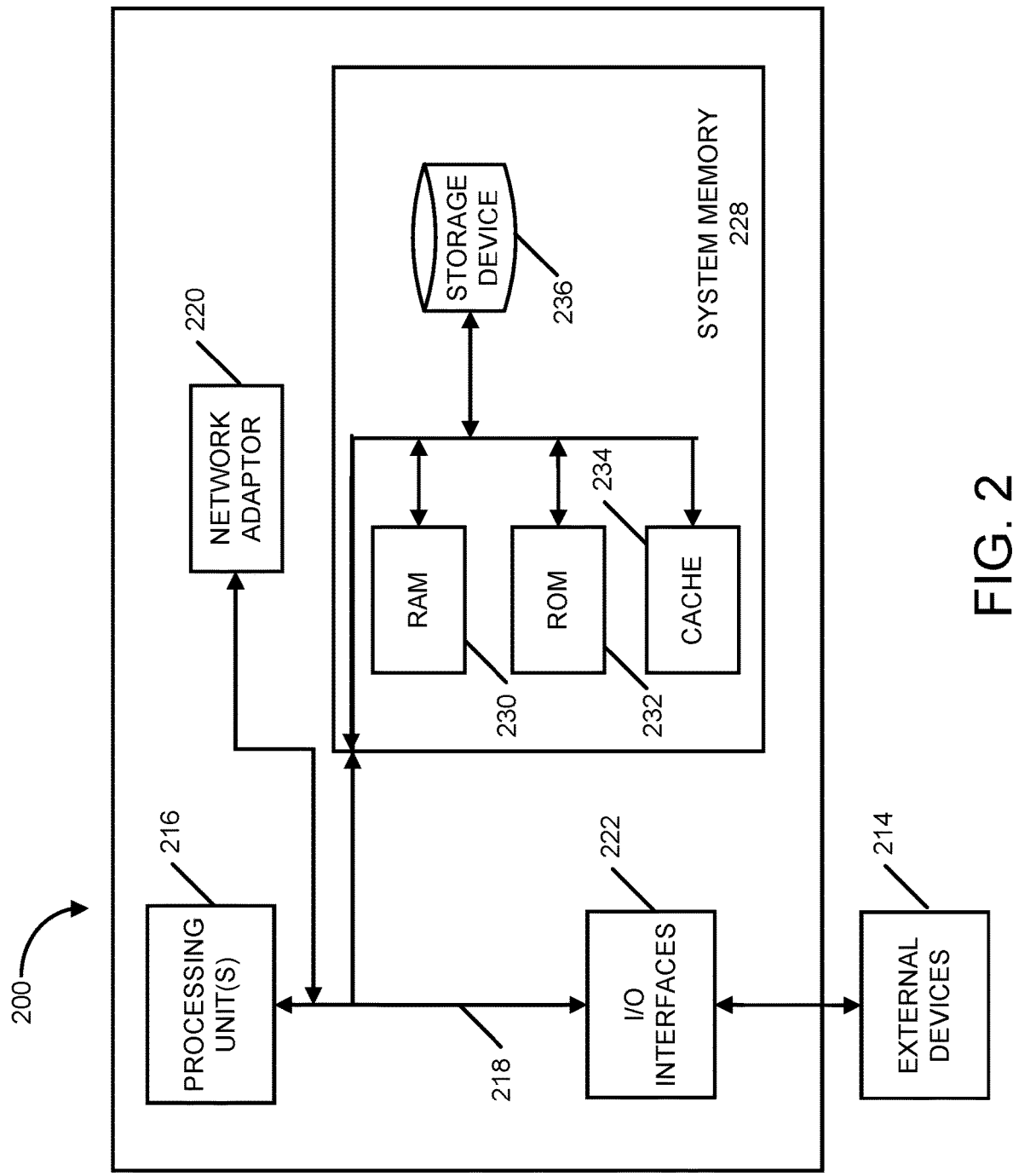
FIG. 2 is a functional block diagram of a computing system that may implement any of interceptor hub, and application system, and an application management service.

FIG. 2 illustrates an example computing system 200 that may implement any of application systems 102-112, API management services 118-122, and interceptor hub 114.

Computing system 200 is shown in a form of a general-purpose computing device. Components of computing system 200 may include, but are not limited to, one or more processing units 216, a system memory 228, and a bus 218 that couples various system components including system memory 228 to one or more processing units 216.

Bus 218 represents any one or more of several bus structure types, including a memory bus or memory controller, a peripheral bus, an accelerated graphics port, and a processor or local bus using any of a variety of bus architectures. Such architectures may include, but not be limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include various non-transitory computer system readable media, which may be any available non-transitory media accessible by computing system 200. The computer system readable media may include volatile and non-volatile non-transitory media as well as removable and non-removable non-transitory media.

System memory 228 may include non-transitory volatile memory, such as random access memory (RAM) 230 and cache memory 234. System memory 228 also may include non-transitory non-volatile memory including, but not limited to, read-only memory (ROM) 232 and storage system 236. Storage system 236 may be provided for reading from and writing to a nonremovable, non-volatile magnetic medium, which may include a hard drive or a Secure Digital (SD) card. In addition, a magnetic disk drive, not shown, may be provided for reading from and writing to a removable, non-volatile magnetic disk such as, for example, a floppy disk, and an optical disk drive for reading from or writing to a removable non-volatile optical disk such as a CD-ROM, DVD-ROM or other optical media. Each memory device may be connected to bus 218 by at least one data media interface. System memory 228 further may include instructions for processing unit(s) 216 to configure computing system 200 to perform functions of embodiments of the invention. For example, system memory 228 also may include, but not be limited to, processor instructions for an operating system, at least one application program, other program modules, program data, and an implementation of a networking environment.

Computing system 200 may communicate with one or more external devices 214 including, but not limited to, one or more displays, a keyboard, a pointing device, a speaker, at least one device that enables a user to interact with computing system 200, and any devices including, but not limited to, a network card, a modem, etc., that enable computing system 200 to communicate with one or more other computing devices. The communication can occur via Input/Output (I/O) interfaces 222. Computing system 200 can communicate with one or more networks including, but not limited to, a local area network (LAN), a general wide area network (WAN), a packet-switched data network (PSDN) and/or a public network such as, for example, the Internet, via network adapter 220. As depicted, network adapter 220 communicates with the other components of computer system 200 via bus 218.

It should be understood that, although not shown, other hardware and/or software components could be used in conjunction with computer system 200. Examples, include, but are not limited to, microcode, device drivers, redundant processing units, external disk drive arrays, RAID systems, tape drives, and data archival storage systems, etc.

Figure 3:
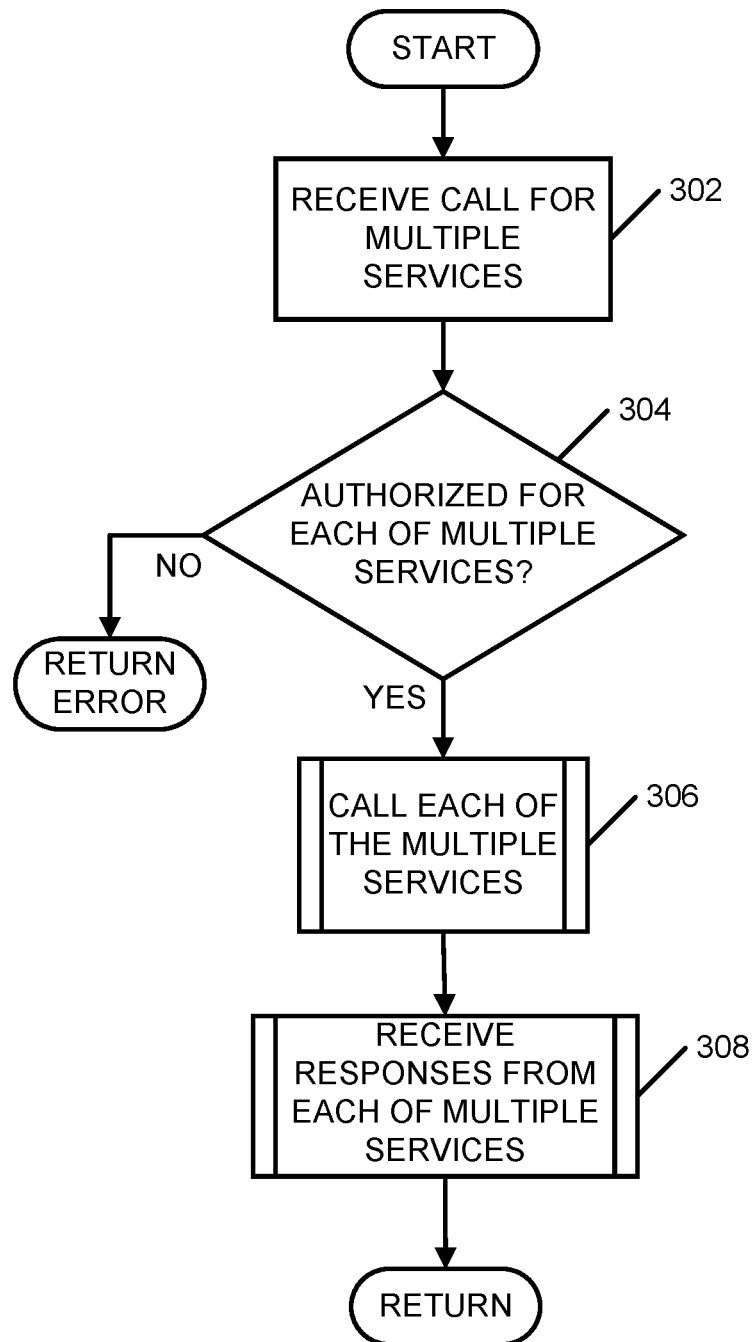
FIG. 3 is a flowchart of an example process that may be performed by an interceptor hub application when a combined call for multiple services is received.
Figure 4:
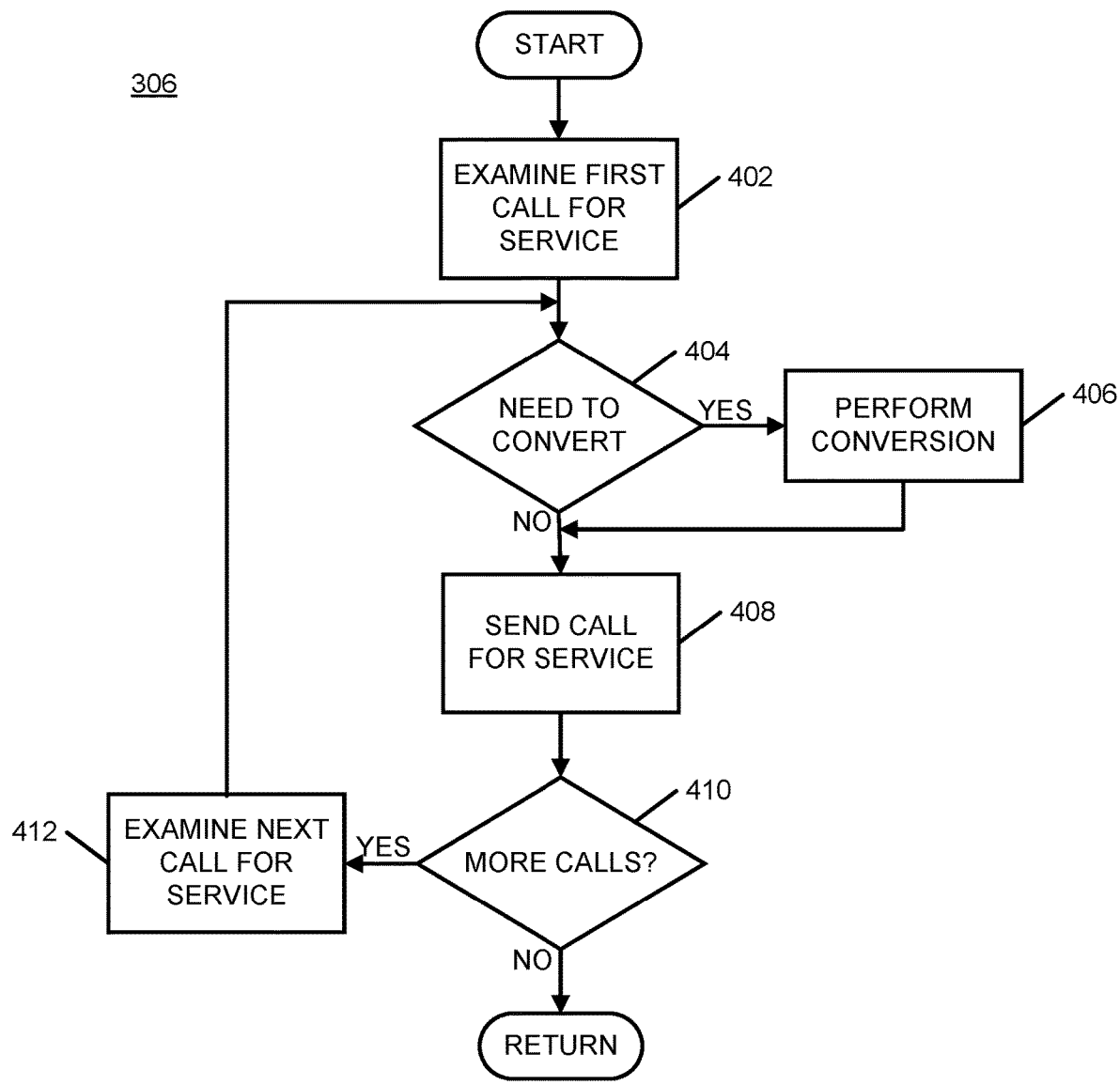
FIG. 4 is a flowchart illustrating an example process that may be performed by an interceptor hub application to process the combined call for services and send respective calls for each of the services.
Figure 5:
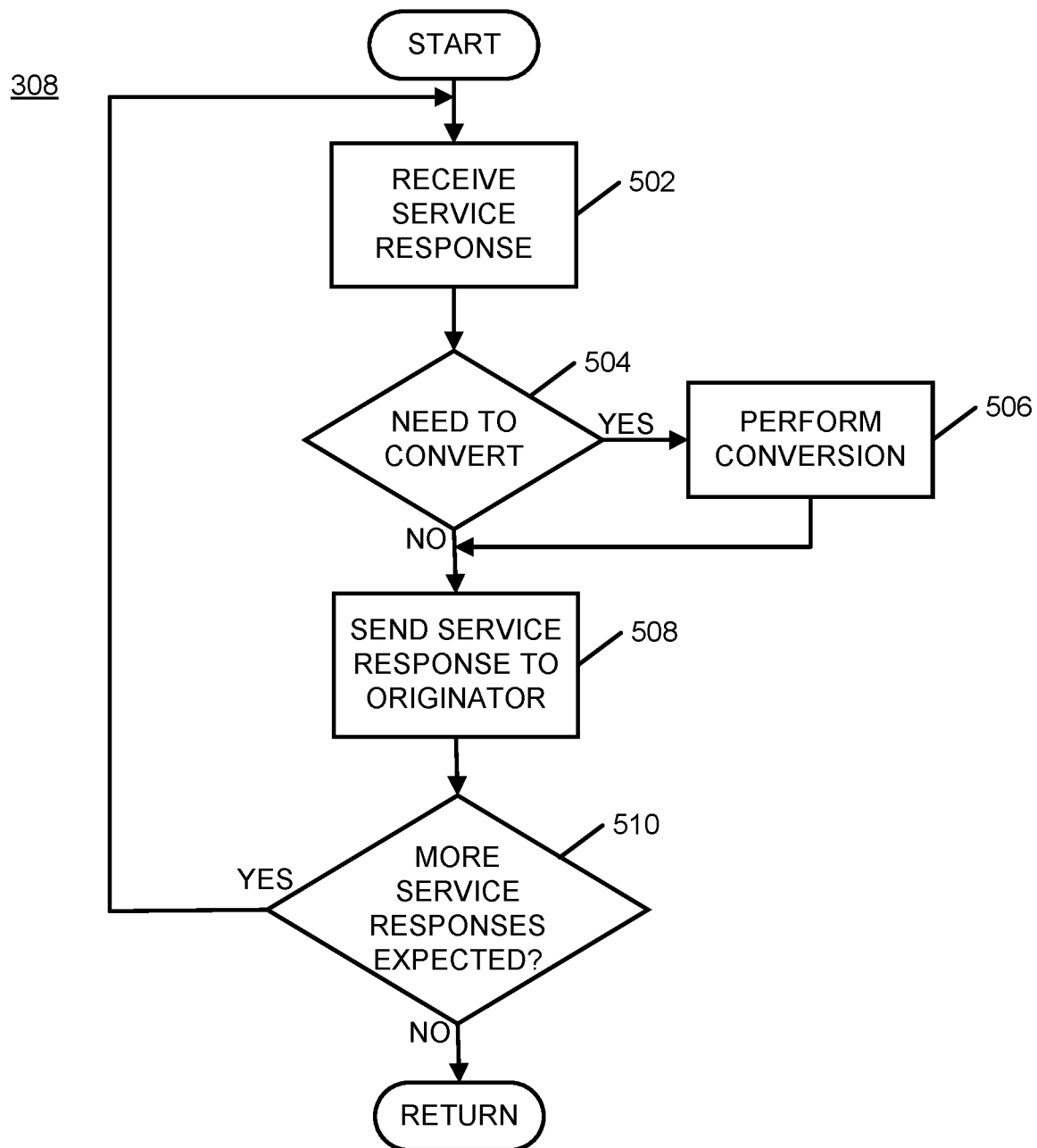
FIG. 5 is a flowchart of an example process that may be performed by an interceptor hub application to process received service responses in response to sending of multiple service requests corresponding to service requests in a received combined call for services.

In some embodiments, a service-consuming application executing on an application system may send a request to interceptor hub 114, which may be an interceptor hub application executing on a computing device, for one or more services. In this example, the service-consuming application sends a single request that includes calls for multiple services. FIGS. 3-5 are flowcharts that illustrate an example process that may be performed by interceptor hub 114 in various embodiments when a request including calls for multiple services is received by interceptor hub 114. The process may begin with interceptor hub 114 receiving a single request for multiple services from a service-consuming application executing on an application system (act 302). Interceptor hub 114 may receive the request via an API between the service-consuming application and interceptor hub 114, and if needed, may perform a data conversion to convert data included in the request to a format understood by interceptor hub 114.

In some embodiments, interceptor hub 114 may access database 116 to determine whether the service-consuming application is authorized to call each of the multiple services (act 304). If interceptor hub 114 determines that the service-consuming application is not authorized to request, or call, each of the multiple services, then an error code or message may be provided to the service-consuming application. Otherwise, if interceptor hub 114 determines that the service-consuming application is authorized to request, or call, each of the multiple services, then interceptor hub 114 may call each of the multiple services at a corresponding address that each of the service-consuming applications is authorized to call, as indicated in, for example, database 116 (act 306).

Responsive to calling each of the multiple services, interceptor hub 114 may receive service responses from each of the multiple services (act 308) and may provide the responses to the service-consuming application.

FIG. 4 is a flowchart illustrating act 306 in more detail. The process may begin with interceptor hub 114 examining a first call for service (act 402). Interceptor hub 114 then may determine whether any data in the call for service needs to be converted to a different format or protocol (act 404). For example, a service caller, or requester, may want a service response to be in a particular format such as JSON, XML, or another format that may have delimited values, fixed length fixed position, or even a partial payload. As an example, a data set {a,bc,def} may be requested as comma-separated values (as shown) or may be separated by another delimiter {a/bc/def}. The service response may be requested in a fixed length format such as, for example, (a^^^bc^^^def^^), where ^ represents a space character and each field may have a length of five characters as shown, or another length. A request may be made for a generic provided service to provide a partial payload that is relevant to a requesting application. For example, if only fields 1 and 2 are relevant to an application, application1, then interceptor hub 114 may return only (a,bc) to application1 instead of a complete payload.

If any of the data in the call for service needs to be converted to a different format or to a different protocol, then interceptor hub 114 may perform the conversion (act 406). Interceptor hub 114 then may send the call for the service to an application system on which the service is executing, as indicated by database 116 (act 408).

Interceptor hub 114 then may determine whether there are any additional calls for services (act 410). If there are no additional calls for services, then the process may be completed. Otherwise, a next call for a service may be examined by interceptor hub 114 (act 412) and acts 404-410 again may be performed.

FIG. 5 is a flowchart that illustrates example processing of act 308 in more detail. The process may begin with interceptor hub 114 receiving a service response from a service executing on an application system (act 502). The service response is provided via a protocol and is in a format that interceptor hub 114 expects from the service. Interceptor hub then may determine whether the service response needs to be converted to a protocol and a format that an originating service-consuming application expects (act 504). If a conversion is needed to convert the format of the service response or change the protocol for the service response, then interceptor hub 114 may perform the conversion (act 506) and may then provide the service response to the originating service-consuming application (act 508). Interceptor hub 114 then may determine whether any more service responses are expected (act 510). If more service responses are expected, interceptor hub 114 may wait for and process a next received service response (act 502).

In an alternative embodiment, instead of separately providing each service response to the originating service-consuming application, interceptor hub 114 may buffer each of the received service responses corresponding to each of the calls for service included in the call for services received from the originating service-consuming application during act 302. Once all of the service responses have been received from the multiple services and buffered, interceptor hub 114 may combine the service responses into a single combined service response that is sent to the originating service-consuming application. Thus, for example, if a service provides employee name, scheduled start time, and last clocked action given for a request, the original service-consuming application may receive a response for a single employee or may request and receive a combined response for multiple employees. If the combined response is requested, interceptor hub 114 would recognize the request for the combined response as a batch type request and would submit individual requests to the service. Interceptor hub 114 then would consolidate individual responses from the service and send the consolidated individual responses back to the originating service-consuming application in aggregate.

Figure 6:
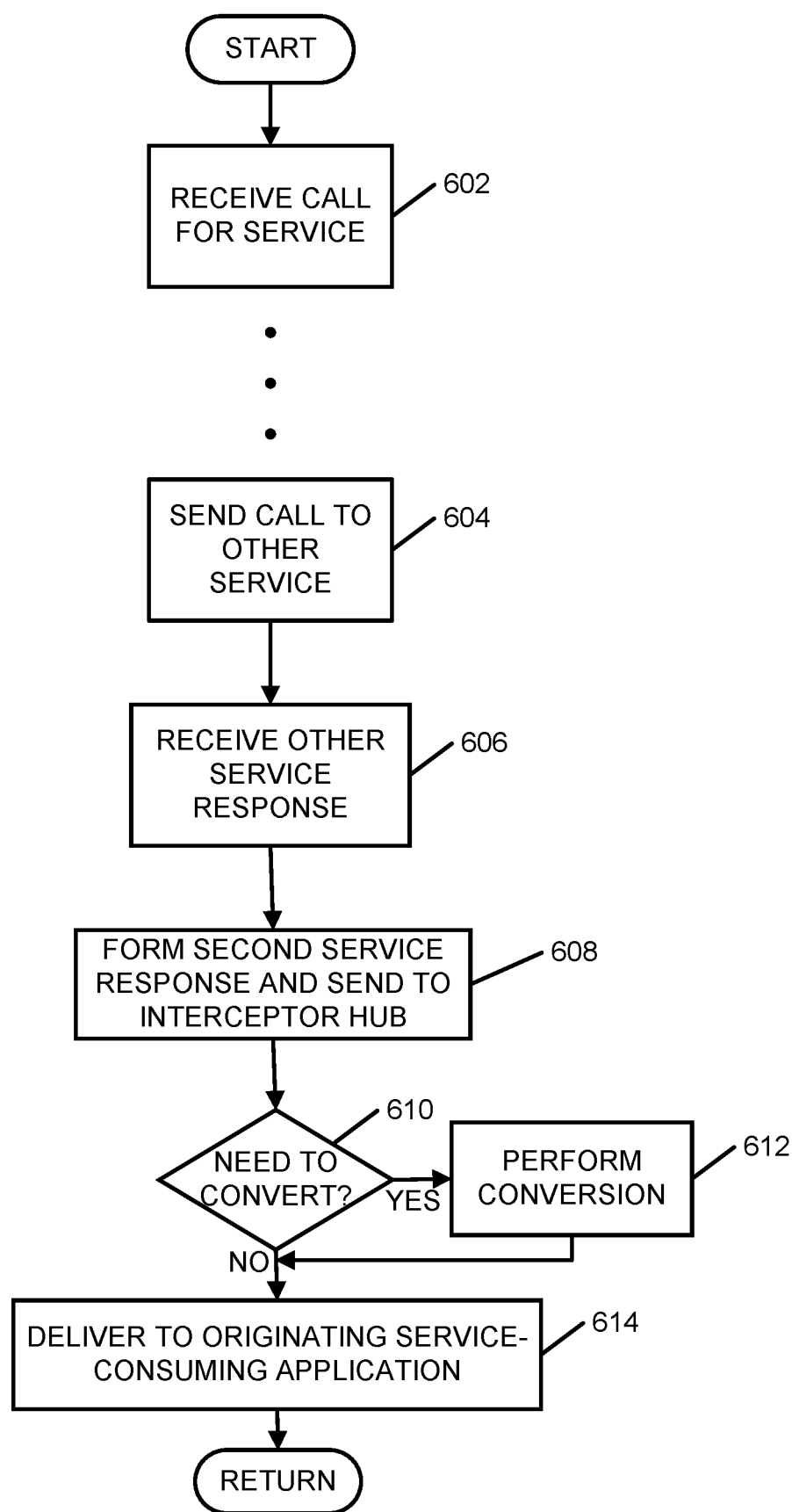
FIG. 6 shows example processing for a service that sends a call to and receives a response from another service.

In some embodiments, a service called by a service-consuming application may call another service executing on a same or other application system. FIG. 6 illustrates example processing with respect to a service that calls another service. The process may start with an application system or other computing system such as, for example, a computing system that executes an interceptor application as well as the service-consuming application, receiving a call for the service from the service-consuming application via the interceptor application (act 602). If the service is executing on a same computing system as the interceptor hub application, the call for the service from the service-consuming application may be received by the service via a second interceptor hub application executing on a second computing system. In this example, the call for the service is processed by the service, which sends a call for a different service while performing processing related to the service (act 604). The call for the different service may be received by the interceptor hub application executing in the same computing system as the service or by a different interceptor hub application executing on another computing system, depending on a configuration for the service. The interceptor hub application receiving the call for the different service may determine whether the calling application is authorized to call the different service, and if the application is authorized, may perform a conversion, as previously discussed, and may send the call to the different service at a network address indicated by a database such as, for example, database 116.

The service may receive a service response from the different service (act 606) via an interceptor hub application that provided the call to the different service. After receiving the service response from the different service, the service may form a second service response and may send the second service response to the interceptor hub application that provided the call to the service (act 608). The interceptor hub application that receives the service response from the service, may perform any required conversions (acts 610-612), and may deliver the service response to the originating service-consuming application (act 614).

In some embodiments, a service consuming application and/or interceptor hub 114 (i.e. interceptor hub application) may use representational state transfer (REST) to access Web services. A RESTful web service provides an application access to web resources in a textual representation. Reading and modification of web resources of a RESTful web service is performed by using a stateless protocol and a predefined operation set. Via a RESTful web service, a request to a resource's uniform resource indicator (URI) may produce a response formatted in Hypertext Markup Language (HTML), eXtended Markup Language (XML), Javascript Object Notation (JSON), or another format. Hypertext Transfer Protocol (HTTP) is commonly used and available HTTP methods include GET, HEAD, POST, PUT, PATCH, DELETE, CONNECT, OPTIONS and TRACE, but other protocols (e.g., HTTPS) may be implemented without departing from the scope of the present disclosure.

Figure 7:
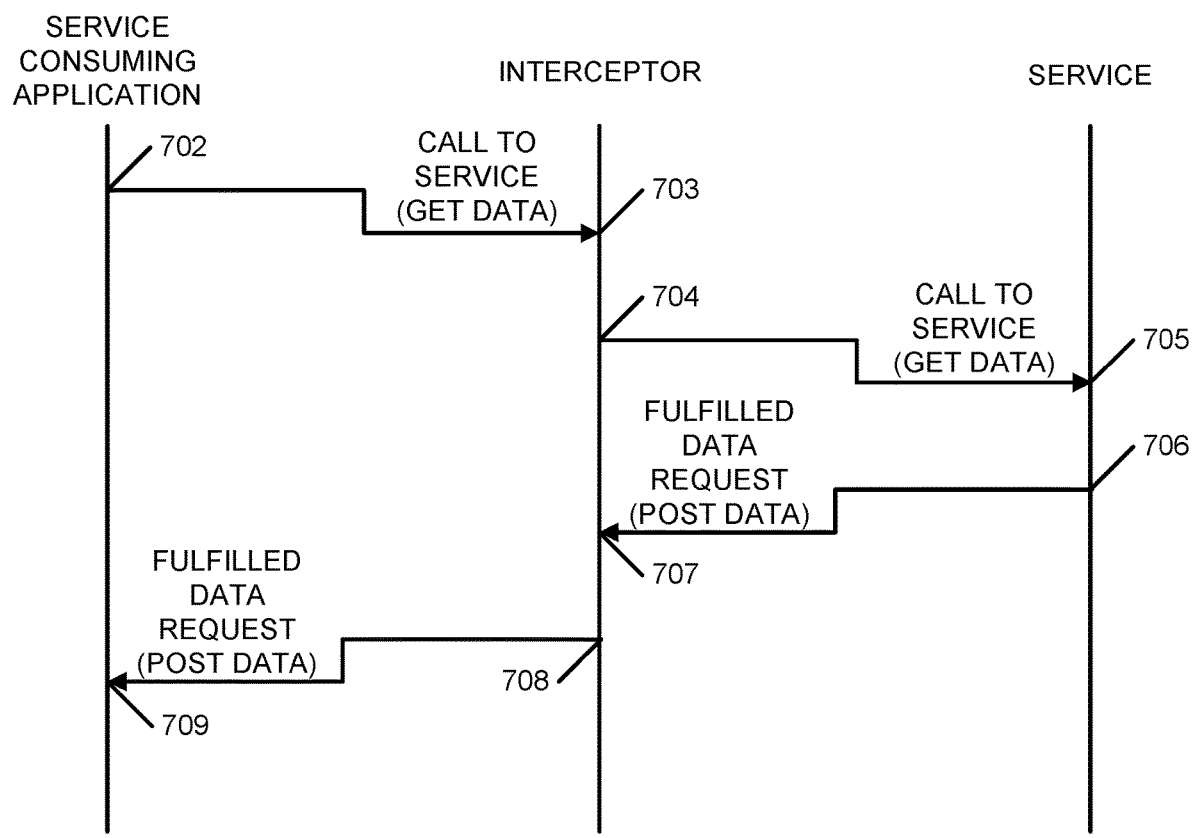
FIG. 7 is a data flow diagram illustrating a data flow that uses RESTful web services to transfer data.

FIG. 7 illustrates an example of a service-consuming application calling a RESTful web service via interceptor hub 114, and for purposes of explanation, the HTTP protocol is described. This is illustrative only and not intended to be limiting. At step 702, a service-consuming application executing in an application system makes a call to a service using the HTTP method GET to request data from the service. The call to the service may be routed to interceptor hub 114 based on a configuration of the application system on which the service-consuming application executes. Interceptor hub 114 may receive the call to the service at step 703, and may access database 116 to determine whether the service-consuming application is authorized to call the service. If the service-consuming application is authorized to call the service, then interceptor hub 114 may call the service based on an address obtained from database 116 using the HTTP method GET at step 704. The service may process the call to the service at step 705 and may provide a service response fulfilling the request for data by using the POST HTTP method at step 706. At step 707, interceptor hub 114 may receive the service response and may provide the service response to the service-consuming application using a second POST HTTP method at steps 708-709.

Figure 8:
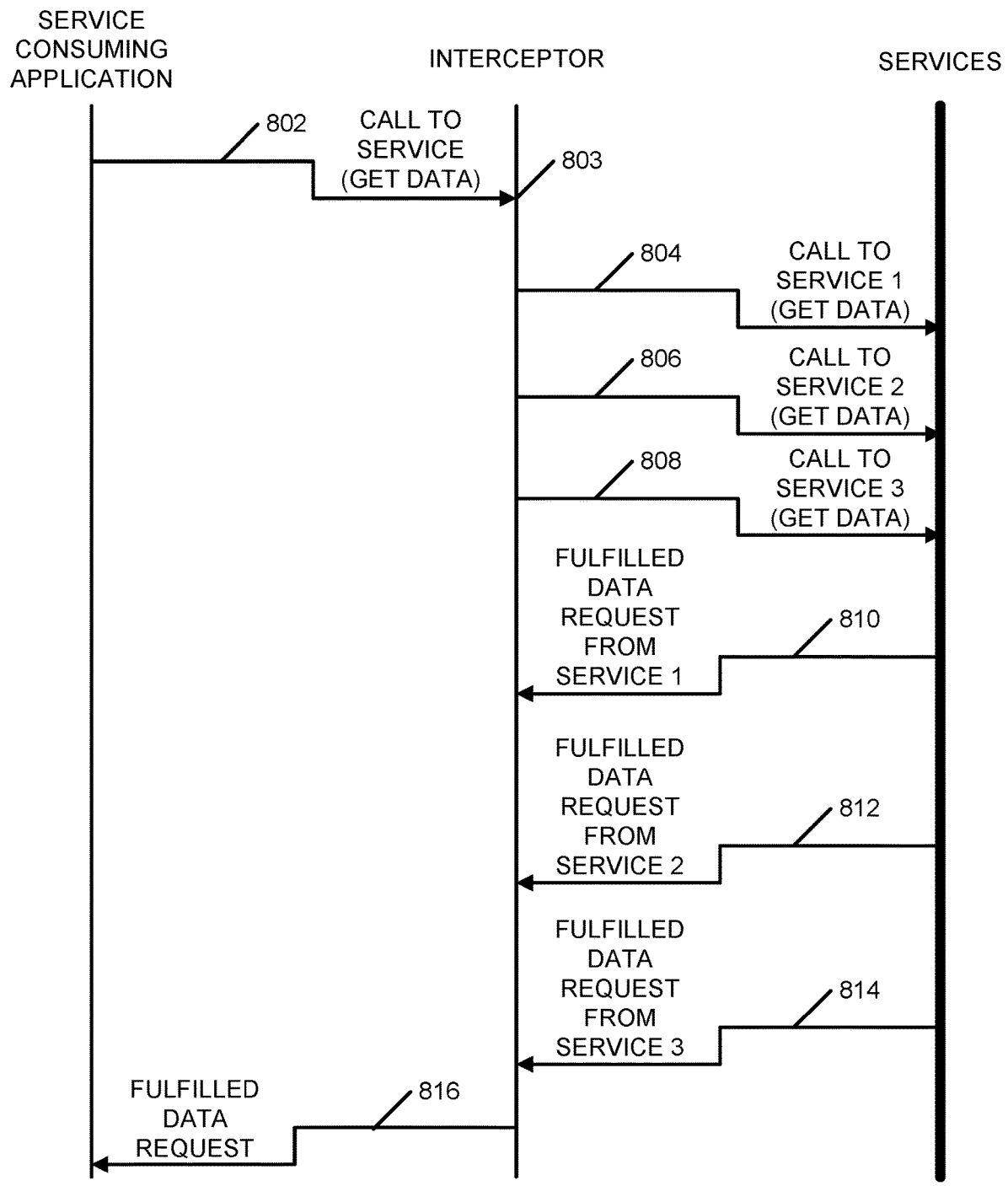
FIG. 8 illustrates an example data flow when an interceptor hub application receives a combined request to call multiple services.

In some embodiments, interceptor hub 114 may receive a call to a service that is an aggregated group of calls to multiple services. FIG. 8 illustrates a dataflow regarding such a call. Although, interceptor hub 114 may perform protocol and data conversion, as previously discussed, the details of such conversion are not mentioned in this example in order to simplify the explanation of this example dataflow. At step 802, a service-consuming application makes a single call that includes a call to multiple services. At step 803, interceptor hub 114 receives the call, performs any conversion needed for interceptor hub 114 to understand the call, and determines whether the service-consuming application is authorized to call the multiple services by accessing database 116. Assuming that the service-consuming application is authorized to call the multiple services, interceptor hub 114 may send calls to the multiple services at addresses obtained from database 116 (steps 804, 806, and 808).

In the example shown in FIG. 8, three calls are made to three different services. However, this is illustrative only, and fewer calls to services or more calls to services could be made based on a single call to a service received from a service-consuming application.

At steps 810, 812, 814 interceptor hub 114 receives service responses from the three different services. Although FIG. 8 shows the service responses being received in an order in which the calls to services were sent, the service responses may be received by interceptor hub 114 in a different order. After all of the service responses corresponding to the calls to services are received by interceptor hub 114 from the corresponding services, interceptor hub 114 may provide, to the service-consuming application, a single service response that combines the service responses from each of the multiple services (step 816). Thus, interceptor hub 114 may aggregate responses from multiple services that provide different data. The aggregated responses then may be sent back to the requesting service-consuming application as a single response to a single request. For example, assume that application A requests an amount of unpaid leave used year to date, annual salary, and current occupation code in a single request. The services may be provided by application B, application C, and application D, respectively. Through configuration or coding, interceptor hub 114 knows which services to request and makes the request or calls for the services. When the requests have been fulfilled, interceptor hub 114 may aggregate service responses into a single response to send back to the requesting service-consuming application.

By avoiding a tight coupling between service-consuming applications and services, the abovementioned embodiments provide flexibility in maintenance and support of application systems utilizing interface technologies that change in a manner that can be managed by interceptor hub 114 with little or no impact to application systems exchanging information. For example, because of a loose coupling between a service consuming application and a service, if a particular application system changes, only an interface between and interceptor hub and the particular application system may be impacted instead of affecting other application systems that partner with the particular application system.

In some embodiments, the interceptor hub may provide a single interface to a particular application system for use by other application systems that utilize different technologies and protocols.

An interceptor hub can be implemented in a number of topologies including, but not limited to: a local network implementation, (on premises), serving local partners only, remote partners only, or local and remote partners; and a cloud implementation (Infrastructure as a Service (IaaS), Platform as a Service (PaaS), Software as a Service (SaaS)), servicing local partners only, remote partners only, or local and remote partners.

Flexibility of various embodiments are best illustrated by the following example scenarios.

In a first scenario, application system ABC provides a service A. Application system XYZ uses service A via API management service A and protocol A. Application system XYZ changes to use API management service B. There are no changes to an interface to application system ABC. As application system XYZ is migrated to API management system B, interceptor hub can plug into API management system B to deliver service A data to application system XYZ. During a phased migration, the interceptor hub can use both API management service A and API management service B to deliver the service A data to application system XYZ. Sometime later, application system EFG would like to use service A provided by application system ABC with no changes to the interface to application system ABC. Application system EFG could use API management service A, API management service B, or another API management service. The interceptor hub may plug into one of the API management services used by application system EFG.

Sometime later, application system ABC migrates from technical stack 1 to technical stack 2, both hardware and technology stacks are changing. The interceptor hub can plug into application system ABC to use technical stack 2 and provide service responses from service A to application system XYZ and application system EFG without any changes being made to application system EFG and application system XYZ. The interceptor hub can provide service responses from application system ABC, service A, from both technical stack 1 and technical stack 2 through configuration options that enable a phased migration of application system ABC from technical stack 1 to technical stack 2. When the migration is complete, the interceptor hub system may be unplugged from application system ABC, service A, technical stack 1 with no impact to usage of application system ABC, service A by application system EFG and application system XYZ.

In a second scenario, application system XYZ utilizes application system ABC, service A, via API management service B utilizing protocol A. Application system XYZ elects to migrate to protocol B. There is no impact to application system ABC. In this scenario, the interceptor hub implemented multiple protocols for delivering services. The interceptor hub can configure delivery of service responses from application system ABC, service A, to application system XYZ utilizing protocol B. The migration could be configured as a phased migration.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or improvement over conventional technologies, or to enable others of ordinary skill in the art to understand the embodiments disclosed herein.

Aspects of the present invention are described herein with reference to flowchart illustrations and/or block diagrams of methods, apparatus (systems), and computer-readable storage devices having instructions stored therein for carrying out functions according to embodiments of the invention. It will be understood that each block of the flowchart illustrations and/or block diagrams, and combinations of blocks in the flowchart illustrations and/or block diagrams, can be implemented by computer readable program instructions. Each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The invention claimed is:

1. A method for providing an interceptor interface for service-consuming applications, the method comprising:
   receiving via a network, by an interceptor hub application executing on a first computing device, a request for a plurality of services from a first service-consuming application executing on a second computing device, the plurality of services executing on at least one other computing device and being accessible via the first computing device through the network, the request for the plurality of services being in a first format for the interceptor interface;
   converting, by the interceptor hub application, at least some information in the received request for the plurality of services to corresponding formats of respective interfaces of at least some of the plurality of services;
   sending, by the interceptor hub application, a respective request to each of the requested plurality of services executing on a corresponding one of the at least one other computing device, the each respective request including a corresponding portion of the information in the corresponding format of the respective interface;
   receiving, by the interceptor hub application, a respective service response from the each of the plurality of respective services; and
   providing, by the interceptor hub application, each of the respective service responses in a combined service response to the first service-consuming application in a response format expected by the first service-consuming application.

2. The method of claim 1, further comprising:
   executing a first service on the first computing device;
   receiving, by the first service, a first request for the first service from a second service-consuming application;
   sending, by the first service in response to the receiving of the first request, a second request for a second service to a second interceptor hub application executing on a computing device different from the first computing device;

receiving, by the first service from the second interceptor hub application, a second service response in response to the sending of the second request for the second service; and sending, by the first service after the receiving of the second service response from the second interceptor hub application, the second service response to the second service-consuming application.

3. The method of claim 1, further comprising:

managing, by the interceptor hub application, which service-consuming applications can request which services.

4. The method of claim 3, wherein the managing further comprises:

maintaining, by the interceptor hub application, a database including information regarding a plurality of service-consuming applications and services which each of the plurality of service-consuming applications are permitted to use.

5. The method of claim 1, wherein an application program interface between the interceptor hub application and the first service-consuming application includes a RESTful application program interface.

6. The method of claim 1, wherein a first application program interface through which the interceptor hub application receives a request for a particular service is different from a second application program interface through which the interceptor hub application sends the request for the particular service to the particular service among the plurality of services.

7. The method of claim 1, further comprising:

in response to the interceptor hub application sending a request to a particular service, receiving, by the interceptor hub application, a service response from the particular service; and directly storing, by the interceptor hub application, information included in the service response from the particular service to a database used by the first service-consuming application that originated the request to the particular service.

8. A computing device executing an interceptor hub application for an interceptor interface for service-consuming applications, the computing device comprising:

at least one processor; and a memory connected to the at least one processor and storing instructions for the at least one processor, wherein the instructions configure the at least one processor to perform operations of the interceptor hub application, the operations comprising:

receiving, via a network, a request for a plurality of services from a first service-consuming application executing on a second computing device, the plurality of services executing on at least one other computing device and being accessible via the first computing device through the network, the request being in a first format for the interceptor interface;

converting, by the interceptor hub application, at least some information in the received request for the plurality of services to corresponding formats of respective interfaces of at least some of the plurality of services;

sending a respective request to each of the requested plurality of services executing on a corresponding one of the at least one other computing device, the each respective request including a corresponding portion of the information in the corresponding format of the respective interface;

receiving, in response to the sending of the respective requests, a respective service response from the each of the plurality of respective services; and providing each of the respective service responses in a combined service response to the first service-consuming application in a response format expected by the first service-consuming application.

9. The computing device of claim 8, wherein the computing device is further configured to perform operations comprising:

executing a first service on the computing device;

receiving, by the first service, a first request for the first service from a second service-consuming application;

sending, by the first service in response to the receiving of the first request, a second request for a second service to a second interceptor hub application executing on a second computing device different from the computing device;

receiving, by the first service from the second interceptor hub application, a second service response in response to the sending of the second request for the second service; and sending, by the first service after the receiving of the second service response from the second interceptor hub application, the second service response to the second service-consuming application.

10. The computing device of claim 8, wherein the operations further comprise:

managing which service-consuming applications can request which services.

11. The computing device of claim 10, wherein the computing device is further configured to perform operations comprising:

maintaining a database including information regarding a plurality of service-consuming applications and services which each of the plurality of service-consuming applications is permitted to use.

12. The computing device of claim 8, wherein an application program interface between the interceptor hub application and the first service-consuming application includes a RESTful application program interface.

13. The computing device of claim 8, wherein a first application program interface through which the interceptor hub application receives a request for a particular service is different from a second application program interface through which the interceptor hub application sends the request for the particular service to the particular service among the plurality of services.

14. The computing device of claim 8, wherein the operations further comprise:

receiving a service response from a particular service in response to sending a request to the particular service; and directly storing information included in the service response from the particular service to a database used by the first service-consuming application that originated the request to the particular service.

15. A computer program product comprising at least one non-transitory computer readable storage medium having computer readable code embodied therewith for execution on a first computing device, the computer readable code being configured to be executed by the first computing device to perform operations of a first interceptor hub application, the operations comprising:

receiving, via a network, a request for a plurality of services from a first service-consuming application executing on a second computing device, the plurality of services executing on at least one other computing device and being accessible via the first computing device through the network, the request being in a first format for an interceptor interface;

converting, by the first interceptor hub application, at least some information in the received request for the plurality of services to corresponding formats of respective interfaces of at least some of the plurality of services;

sending a respective request to each of the requested plurality of services executing on a corresponding one of the at least one other computing device, the each respective request including a corresponding portion of the information in the corresponding format of the respective interface;

receiving, in response to the sending of the respective requests, a respective service response from the each of the plurality of respective services; and providing each of the respective service responses in a combined service response to the first service-consuming application in a response format expected by the first service-consuming application.

16. The computer program product of claim 15, wherein the operations further comprise:

executing a first service on the first computing device;

receiving, by the first service, a first request for the first service from a second service-consuming application;

sending, by the first service in response to the receiving of the first request, a second request for a second service to a second interceptor hub application executing on a computing device different from the first computing device;

receiving, by the first service from the second interceptor hub application, a second service response in response to the sending of the second request for the second service; and sending, by the first service after the receiving of the second service response from the second interceptor hub application, the second service response to the second service-consuming application.

17. The computer program product of claim 15, wherein the operations further comprise:

managing which service-consuming applications can request which services, the managing further comprising:

maintaining a database including information regarding a plurality of service-consuming applications and the services which each of the plurality of service-consuming applications is permitted to use.

18. The computer program product of claim 15, wherein an application program interface between the first interceptor hub application executing on the first computing device and the first service-consuming application includes a RESTful application program interface.

19. The computer program product of claim 15, wherein a first application program interface through which the first interceptor hub application receives a request for a particular service is different from a second application program interface through which the first interceptor hub application sends the request for the particular service to the particular service.

20. The computer program product of claim 15, wherein the operations further comprise:

in response to the first interceptor hub application sending a request to a particular service, receiving, by the first interceptor hub application, a service response from the particular service; and directly storing, by the first interceptor hub application, information included in the service response from the particular service to a database used by the first service-consuming application that originated the request to the particular service.

* * * * *